United States Patent [19]

Fisher et al.

[11] Patent Number: 4,486,955
[45] Date of Patent: Dec. 11, 1984

[54] ANGULAR POSITION SENSORS

[75] Inventors: Jeremy F. Fisher; Anthony C. Mundy; Michael J. Perry, all of Kent, England

[73] Assignee: Marconi Avionics Limited, England

[21] Appl. No.: 488,747

[22] Filed: Apr. 26, 1983

[30] Foreign Application Priority Data

Apr. 28, 1982 [GB] United Kingdom ................. 8212310

[51] Int. Cl.³ .............................................. G01C 1/08
[52] U.S. Cl. ..................................... 33/262; 33/1 PT
[58] Field of Search ............... 33/1 PT, 229, 235, 240, 33/262, 263, 266, 281, 282, 285, 180 R, 178 E, 174 L, 174 P, 1 M

[56] References Cited

U.S. PATENT DOCUMENTS

| 3,051,047 | 8/1962 | Fieux ........................... 33/262 |
| 3,184,600 | 5/1965 | Potter .......................... 33/1 M |
| 3,262,210 | 7/1966 | Shapiro et al. ............. 33/262 |
| 3,561,125 | 2/1971 | Zeider ......................... 33/174 L |
| 4,258,474 | 3/1981 | Du Mez ....................... 33/174 P |

OTHER PUBLICATIONS

"Helmet Mounted Visually Coupled Systems" by L. Russo; S.I.P., vol. 19, No. 4, 1978, pp. 181-185.

Patent Abstracts of Japan, vol. 4, No. 149, Oct. 21, 1980, p. 123, P 32 JP-A-55-99002.

Primary Examiner—Willis Little
Attorney, Agent, or Firm—Kirschstein, Kirschstein, Ottinger & Israel

[57] ABSTRACT

An angular position sensor, suitably for use in a helmet sight system, comprising a link member (3) connected by first and second (5 and 49) coupling means respectively to first and second fixing means (7 and 57, 59, 63) whereby the sensor may be attached between two bodies (1 and 61) whose relative angular position is to be sensed. The first and second coupling means respectively define axes of permitted angular movement of the first and second fixing means with respect to the link member and are associated with angle sensing means (21, 23 and 51, 53) providing electrical outputs representative of the angular positions of the fixing means about these axes. The sensor further includes a third coupling means (29, 31, 33 or 57, 59) whereby the fixing means may be moved translationally with respect to one another without altering any of the outputs of the angle sensing means. The sensor includes fourth coupling means (35) and associated angle sensing means (43) permitting relative angular movement of the fixing means about the axis defined by the link member and providing a corresponding electrical output.

13 Claims, 8 Drawing Figures

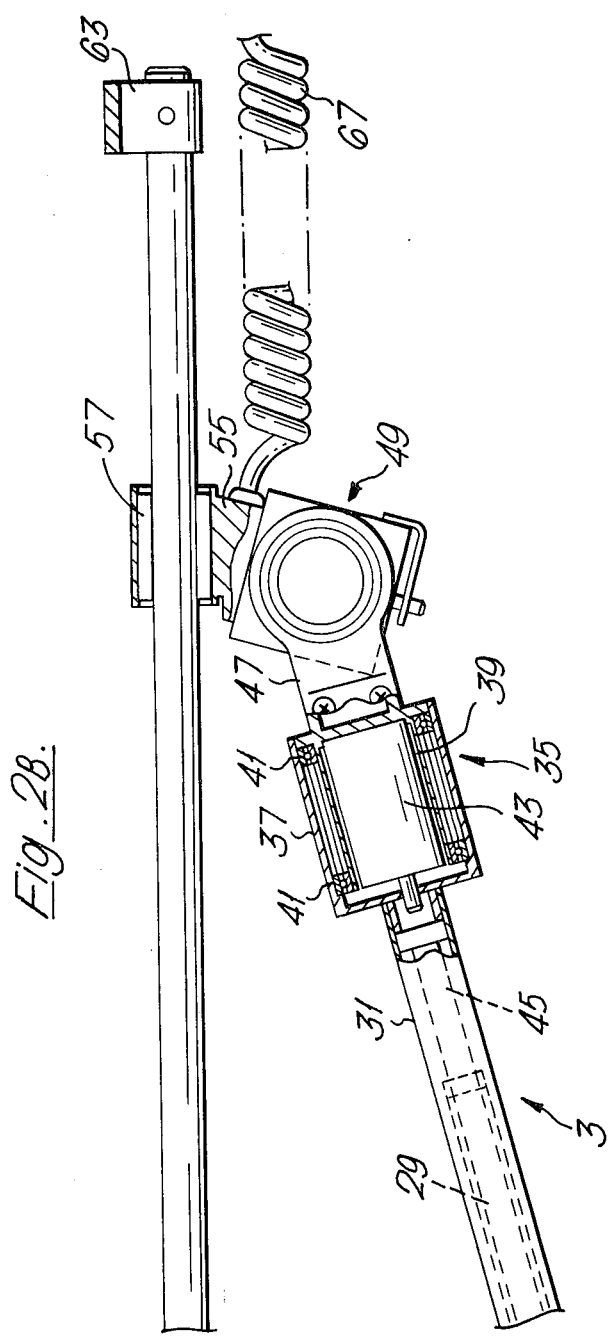

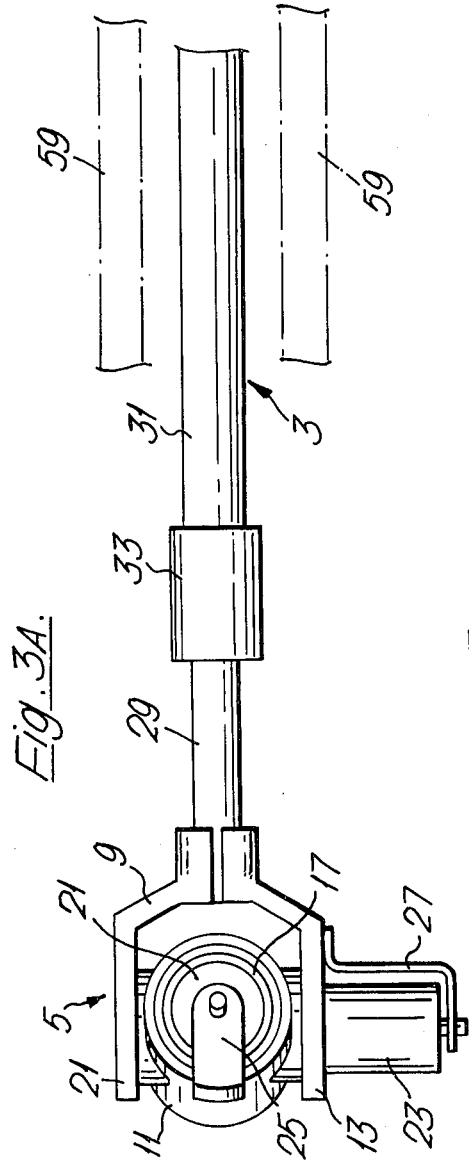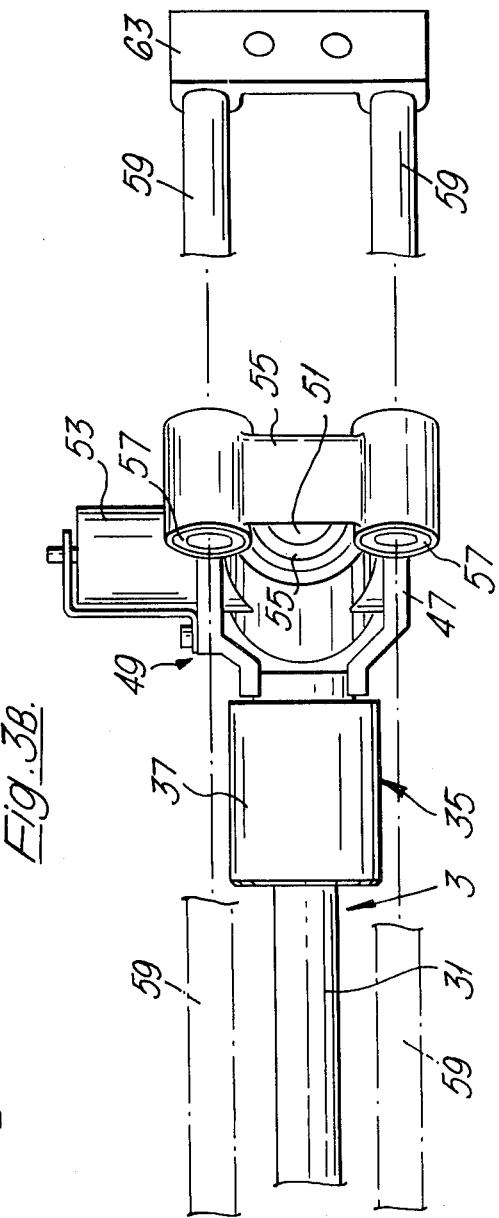

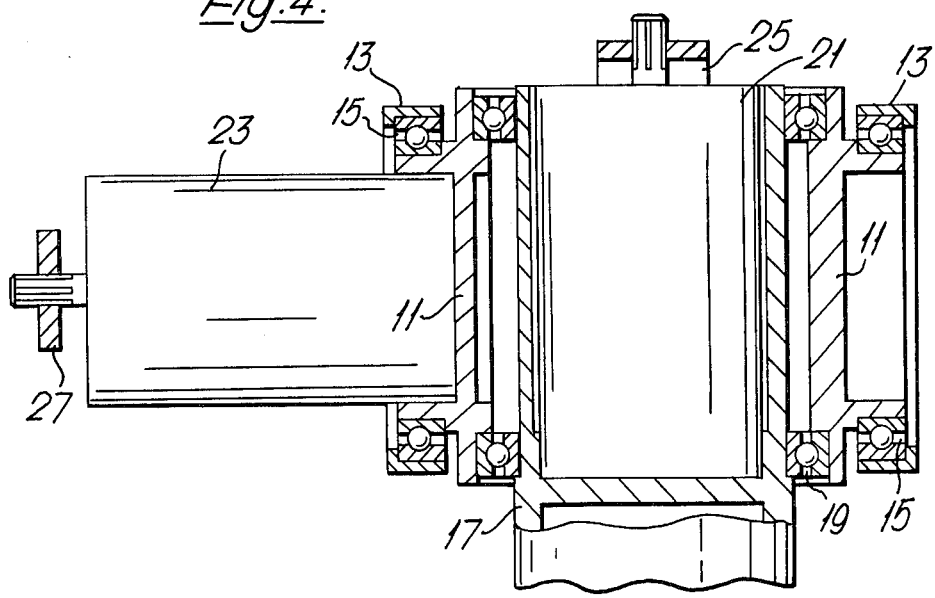
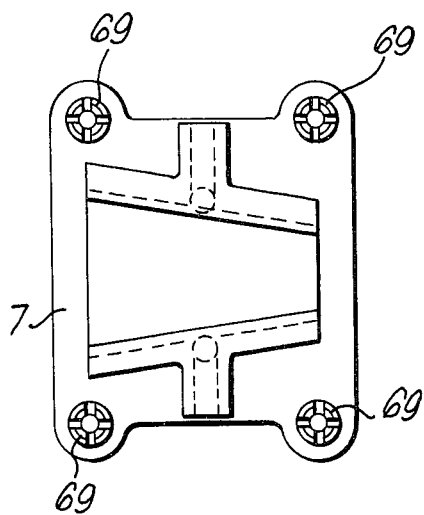
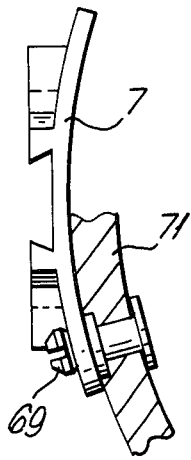

ANGULAR POSITION SENSORS

This invention relates to angular position sensors.

More especially, the invention relates to angular position sensors adapted to produce outputs which are a measure of the relative angular position of two bodies, one body normally defining a co-ordinate reference frame.

One particular application of such sensors is in so-called helmet sight systems. Such systems detect the line of sight of an observer, typically an aircraft pilot, from a measurement of the position of a helmet worn by the observer. In conjunction with appropriate control means such a system may be used to enable a pilot to direct a weapon or other device, e.g. a camera, towards a target simply by looking at the target.

Known helmet sight systems use either mechanical angular position sensors or optical angular position sensors using light sources mounted on the helmet and arranged to direct light beams onto fixed light sensor arrays.

Known sensors of the mechanical type have the disadvantage that they tend to restrict the pilot's movement. Hence, the use of optical angular position sensors has hitherto generally been preferred in helmet sight systems.

It is an object of the present invention to provide a mechanical angular position sensor which is more suitable for use in helmet sight systems than presently known mechanical angular position sensors.

According to the present invention there is provided an angular position sensor for sensing the relative angular position of first and second bodies comprising: first and second fixing means for attachment of the sensor to said first and second bodies respectively; a link member; first and second coupling means whereby the first and second fixing means are respectively connected to said link member for angular movement about respective spaced points lying on an axis defined by said link member, each coupling means permitting angular movement of the associated fixing means about a first axis passing through the associated said point and transverse to said axis defined by the link member and a second axis passing through the associated said point and transverse to and rotatable about said first axis; first and second angle sensing means each of which is associated with a respective one of said first and second coupling means and produces first and second outputs which are respectively representative of the angular position of the associated fixing means about the associated said first and second axes; and third coupling means whereby said first and second fixing means may be moved translationally in at least one direction with respect to one another without altering any of the outputs of said angle sensing means.

Preferably the sensor further includes a fourth coupling means in said link member permitting relative angular movement of said first and second fixing means about the axis defined by said link member; and a third angle sensing means associated with said fourth coupling means which produces an electrical output which is representative of the relative angular position of said first and second fixing means about said axis defined by said link member.

Said third coupling means may comprise a linear coupling incorporated in said link member so that the the spacing between said points may be expanded or contracted. In such an arrangement said link member is suitably of telescopic form.

Alternatively or additionally said third coupling means may comprise a linear coupling incorporated in at least one of said fixing means.

In a sensor according to the invention said first axes are preferably parallel to one another, and are preferably orthogonal to the axis defined by said link member.

Similarly the angle between said first and second axes is preferably the same in each said coupling means, the first and second axes preferably being orthogonal in each coupling means.

One angular position sensor in accordance with the invention forming part of a helmet sight system will now be described, by way of example, with reference to the accompanying drawings in which:

FIG. 2A and 2B are a part-sectional enlarged side view of the sensor of FIG. 1;

FIGS. 3A and 3B are an enlarged plan view of the sensor of FIG. 1;

FIG. 4 is a sectional view on the line A—A in FIG. 2A; and

FIGS. 5 and 6 are plan and side views of a fixing means forming part of the sensor.

Figure 1:
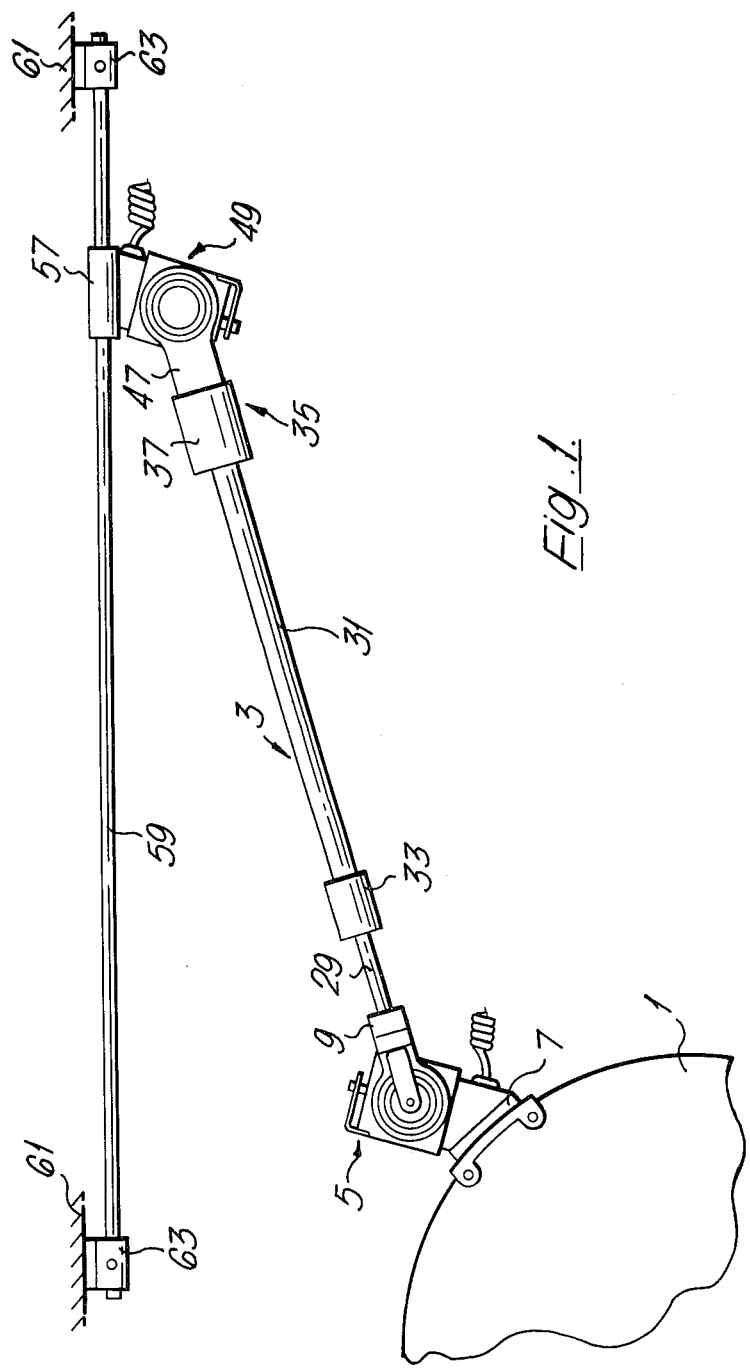
FIG. 1 is a side view of the sensor.
Figure 2A:
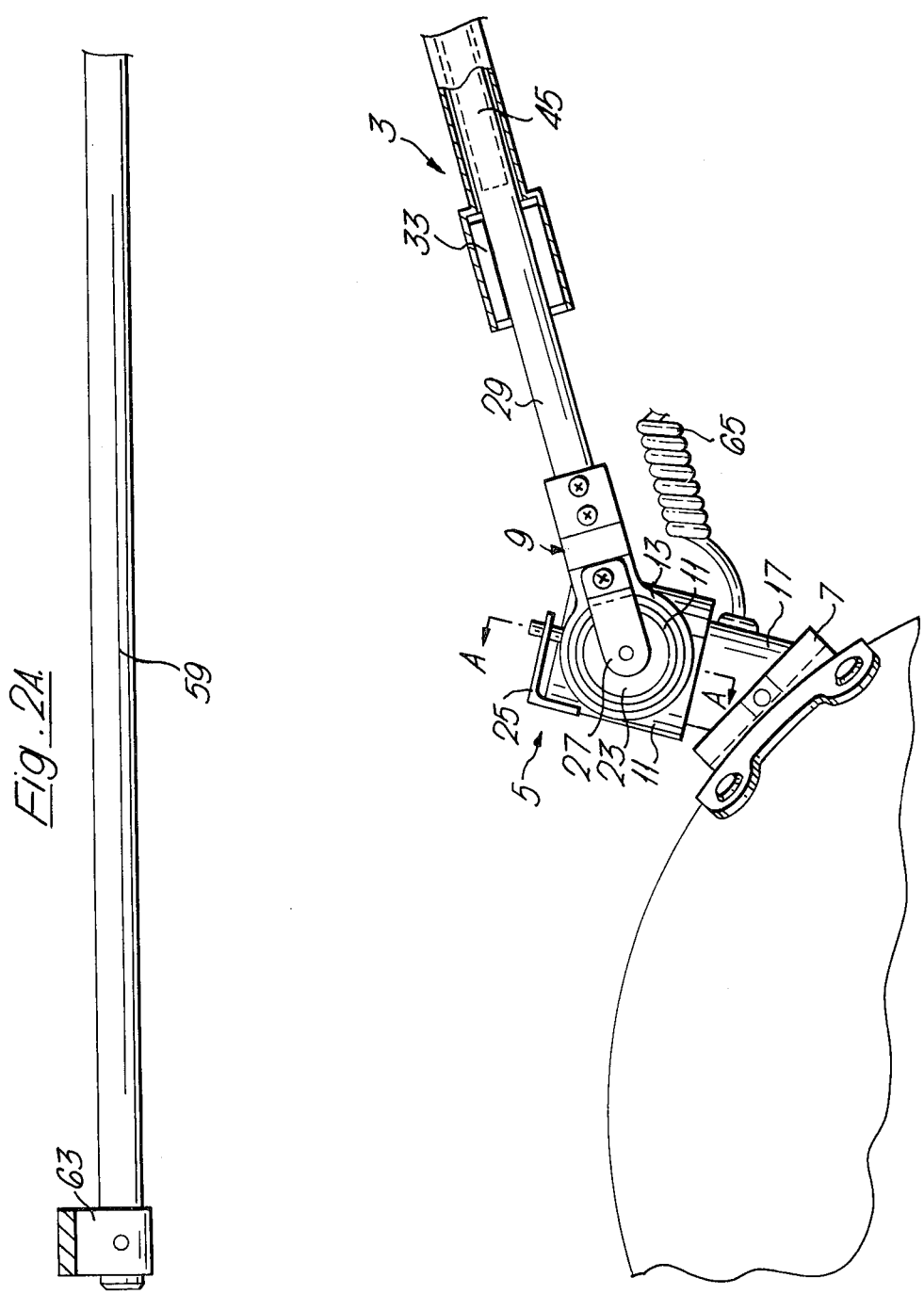

Referring to the drawings, the sensor provides electrical outputs providing an indication of the angular position of a helmet 1, with respect to a co-ordinate reference frame fixed with respect to a vehicle in which the wearer of the helmet is travelling. The helmet is provided with sighting means (not shown) operative in use to direct the helmet wearer to maintain his line of sight in a fixed, predetermined attitude with respect to the helmet 1, so that the sensor outputs are indicative of the angle of the line of sight of the helmet wearer in the co-ordinate reference frame.

The sensor comprises a telescopic link arm 3 one end of which is coupled via means 5 to a fixing plate 7 which is secured to the helmet 1.

Referring particularly to FIG. 4, the coupling means 5 includes a U-shaped frame member 9 secured to the arm 3. A second tubular frame member 11 is mounted between the two limbs 13 of the frame member 9 by means of bearings 15 for rotation about a first axis which intersects the axis of the arm 3 at right angles at a point beyond the end of the arm. Within the frame member 11 there is mounted a third frame member 17 by means of bearings 19 for rotation about a second axis which is rotatable about the first axis and intersects the first axis at right angles at the point at which the first axis intersects the axis of the arm 3. The frame member 17 is also dovetailed to the plate 7.

The coupling means 5 is associated with angle sensing means comprising two synchros 21 and 23. One of the synchros 21 is secured to the frame member 17 with its rotor axis coaxial with the second axis, i.e. the axis of rotation of the frame member 17 with respect to the frame member 11, the rotor of the synchro 21 being fixed to a lug 25 of the frame member 11.

The other synchro 23 is secured to the frame member 11 with its rotor axis coaxial with the first axis, i.e. the axis of rotation of the frame member 11 with respect to the frame member 9, the rotor of the synchro 23 being fixed to a lug 27 of the frame member 9.

The arm 3 comprises two tubular members 29 and 31 slidingly mounted one within the other by means of a linear bearing 33, the frame member 9 being secured to the inner tubular member 29.

At its end remote from the coupling means 5 the arm 3 is provided with a rotary coupling means 35. The coupling means 35 comprises an outer frame member 37 secured to the tubular member 31 and within which there is mounted a further frame member 39 by means of bearings 41 for rotation about the axis of the arm 3.

The coupling means 35 is associated with angle sensing means comprising a synchro 43 mounted on the frame member 35 with its rotor axis coaxial with the axis of the arm 3. The rotor of the synchro 43 is secured to one end of a rod 45 which is splined into the nearer end of the inner tubular member 29 of the arm 3.

The inner frame member 39 of the coupling means 35 is secured to a U-shaped frame member 47 which forms part of a further coupling means 49 which essentially of identical construction to the coupling means 5, the member 47 corresponding to the member 9 of the coupling means 5. The coupling means 49 is associated with angle sensing means comprising two synchros 51 and 53 corresponding to the synchros 21 and 23 associated with the coupling means 5.

A frame member 55 of the coupling means 49 corresponding to the frame member 17 of coupling means 5 is mounted by way of twin linear bearings 57 on a pair of parallel rods 59, the rods 59 being secured at their ends to the vehicle frame 61 by means of fixing plates 63.

Electrical connection to the synchros 21, 23, 43, 51 and 53 is made by way of cables 65 and 67.

To facilitate detachment of the sensor from the helmet, the plate 7 is secured to the helmet 1 by means of snap-on pillars 69 which protrude through the outer skin 75 of the helmet 1 (see FIGS. 5 and 6).

The rods 59 are disposed with their axes parallel to the normal, i.e. a datum line of sight of the wearer of the helmet 1 and the plate 7 is secured to the helmet 1 in a position such that when the helmet wearer directs his line of sight in the normal direction the synchro 23 and the corresponding synchro 53 in the coupling means 49 produce equal and opposite output signals. Similarly, the rods 59 are disposed vertically above the helmet so that the synchros 21 and 51 produce equal and opposite output signals when the helmet wearer directs his line of sight in the normal direction.

The output of synchros 51 and 53 provide an indication of the angular position of the axis of the arm 3 with respect a co-ordinate reference frame fixed with respect to the vehicle frame.

The synchros 21, 23 and 43 provide an indication of the angular position of the helmet 1 with respect to the axis of the arm 3.

Thus the outputs of the synchros 21, 23, 43, 51 and 53 together provide an indication of the angular position of the helmet 1 with respect to the co-ordinate reference frame.

It will be understood that the necessary calculations to determine the helmet angular position from the synchro outputs will be effected by computer means (not shown) to which the synchro outputs are fed by way of cables 65 and 67.

It will be appreciated that the position of mounting of the rods 59 allows limited translational movement of the helmet 1 in a direction parallel to the axes of the rods without alteration of the output of any of the synchros 21, 23, 43, 51 and 53.

Similarly the telescopic form of the arm 3 allows limited translational movement of the helmet 1 in the direction of the axis of the arm without alteration of the output of any of the synchros.

Moreover translational movement of the helmet in any other direction will produce equal and opposite change in the output of synchros 21 and 51 and/or synchros 23 and 53 without altering the output of synchro 43.

Hence, translational movement of the helmet 1 can be effected to a limited extent, sufficient for normal requirements of a wearer travelling in a vehicle, without changing the difference in the outputs of synchros 21 and 51, the difference in the outputs of synchros 23 and 53 or the output of the synchro 43.

It will be appreciated that with a view to allowing translational movement without alteration of the output of any of the synchros, a linear bearing arrangement corresponding to bearings 57 and rods 59 may be alternatively or additionally incorporated in the means whereby the sensor is fixed to the helmet 1.

Calculation of helmet angular position from the synchro outputs is effected as follows:

Taking the angles represented by the outputs of synchros 21,23,43, 51 and 53 to be $\psi_1$, $\theta_1$, $\phi$, $\psi$ and $\theta$ respectively, and adopting the sign convention that, with the helmet wearer looking in the normal direction, $\psi_1 = \psi$ and $\theta_1 = \theta$, the attitude matrix Tuv of the helmet is $$\begin{bmatrix} c\psi_1 & -s\psi_1 & 0 \\ s\psi_1 & c\psi_1 & 0 \\ 0 & 0 & 1 \end{bmatrix} \times \begin{bmatrix} c\theta_1 & 0 & s\theta_1 \\ 0 & 1 & 0 \\ -s\theta_1 & 0 & c\theta_1 \end{bmatrix} \times$$

$$\begin{bmatrix} 1 & 0 & 0 \\ 0 & c\phi & s\phi \\ 0 & -s\phi & c\phi \end{bmatrix} \times \begin{bmatrix} c\theta & 0 & -s\theta \\ 0 & 1 & 0 \\ s\theta & 0 & c\theta \end{bmatrix} \times$$

$$\begin{bmatrix} c\psi & s\psi & 0 \\ -s\psi & c\psi & 0 \\ 0 & 0 & 1 \end{bmatrix}$$

where s and c mean sine and cosine respectively. The matrix Tuv has nine components but only five of these $T_{11}$, $T_{12}$, $T_{13}$, $T_{23}$ and $T_{33}$ are required to give helmet azimuth, elevation and rolls angles A, B and C, as follows:

$$\text{Tan } A = T_{12}/T_{11}$$

$$\text{Sine } B = -T_{13}$$

$$\text{Tan } C = T_{23}/T_{33}$$

where:

$T_{11} = C\psi_1 C\theta_1 C\theta C\psi - S\psi_1(-S\psi C\phi + S\theta C\psi S\phi) + C\psi_1 S\theta_1(S\psi S\phi + S\theta C\psi C\phi)$ $T_{12} = C\psi_1 C\theta_1 C\theta S\psi - S\psi_1(C\psi C\phi + S\theta S\psi S\phi) + C\psi_1 S\theta_1(-C\psi S\phi + S\theta S\psi C\phi)$ $T_{13} = -C\psi_1 C\theta_1 S\theta - S\psi_1 C\theta S\phi + C\psi_1 S\theta_1 C\theta C\phi$ $T_{23} = -S\psi_1 C\theta_1 S\theta + C\psi_1 C\theta S\phi + S\psi_1 S\theta_1 C\theta C\phi$ and $T_{33} = S\theta_1 S\theta + C\theta_1 C\theta C\phi$ The above calculation gives helmet attitude with respect to a system co-ordinate reference frame fixed with respect to the vehicle frame which may or may not be the same as the vehicle co-ordinate reference frame. However, if it is not, the necessary transformation to obtain helmet attitude with respect to vehicle frame axes may be effected quite easily using additional components of the matrix Tuv.

For example, if, as is frequently desirable in aircraft, the system frame has 15° elevation with respect to the vehicle frame, then helmet azimuth, elevation and roll angles A', B' and C' with respect to the vehicle frame axes are given by $$\text{Tan } A' = T'_{12}/T'_{11}$$

$$\text{Sin } B' = -T'_{13}$$

$$\text{Tan } C' = T'_{23}/T'_{33}$$

where
$$T'_{11} = T_{11} \cos 15 + T_{31} \sin 15$$

$$T'_{12} = T_{12} \cos 15 + T_{32} \sin 15$$

$$T'_{13} = T_{13} \cos 15 + T_{33} \sin 15$$

$$T'_{23} = T_{23} \text{ and}$$
$$T'_{33} = T_{33} \cos 15 - T_{13} \sin 15$$

and the additional required matrix components $T_{31}$ and $T_{32}$ are $$T_{31} = -S\theta_1 C\theta C\psi + C\theta_1(S\psi S\phi + S\theta C\psi C\phi)$$

$$T_{32} = -S\theta_1 C\theta S\psi + C\theta_1(-C\psi S\phi + S\theta S\psi C\phi)$$

We claim:

1. An angular position sensor for sensing the relative angular position of first and second bodies comprising:
   (A) first and second fixing means for attachment to said first and second bodies respectively;
   (B) a link member;
   (C) first and second coupling means whereby the first and second fixing means are respectively connected to said link member for angular movement about respective spaced points lying on an axis defined by said link member,
      (i) each coupling means permitting angular movement of the associated fixing means about a first axis passing through the associated said point and transverse to said axis defined by the link member and a second axis passing through the associated said point and transverse to and rotatable about said first axis;
   (D) first and second angle sensing means each of which is associated with a respective one of said first and second coupling means and produces outputs which are respectively representative of the angular position of the associated fixing means about the associated said first and second axes;
      (i) third coupling means whereby said first and second fixing means may be moved translationally in at least one direction with respect to one another without altering any of the outputs of said angle sensing means;
   (F) fourth coupling means in said link member permitting relative angular movement of said first and second fixing means about the axis defined by said link member; and
   (G) a third angle sensing means associated with said fourth coupling means which produces an electrical output which is representative of the relative angular position of said first and second fixing means about said axis defined by said link member.

2. A sensor according to claim 1 wherein said third angle sensing means comprises a synchro.

3. A sensor according to claim 1 wherein said third coupling means comprises a linear coupling incorporated in said link member so that the spacing between said points may be expanded or contracted.

4. A sensor according to claim 3 wherein said link member is of telescopic form.

5. A sensor according to claim 1 wherein said third coupling means comprises a linear coupling incorporated in at least one of said fixing means.

6. A sensor according to claim 1 wherein said first axes are parallel to one another.

7. A sensor according to claim 6 wherein said first axes are orthogonal to the axis defined by said link member.

8. A sensor according to claim 1 wherein the angle between said first and second axis is the same in each said coupling means.

9. A sensor according to claim 8 wherein said second axis is orthogonal to the first axis in each said coupling means.

10. A sensor according to claim 1 wherein corresponding outputs of said angle sensing means are equal and opposite for a datum angular position of said first and second fixing means with respect to one another.

11. A sensor according to claim 1 wherein corresponding outputs of said angle sensing means change by substantially equal and opposite amounts for translational movements of said first and second fixing means with respect to one another.

12. A sensor according to claim 1 wherein said first and second angle sensing means each comprise two synchros each arranged to produce an output representative of the angular position of the associated fixing means about a respective one of the associated said first and second axes.

13. A helmet sight system incorporating an angular position sensor according to claim 1, the sensor being attached by said fixing means between the helmet and another body so that the sensor outputs are representative of the angular position of the helmet.

* * * * *